US008950712B2

(12) United States Patent
Lares

(10) Patent No.: US 8,950,712 B2
(45) Date of Patent: Feb. 10, 2015

(54) CABLE HOLDER

(71) Applicant: Heyco, Inc., Toms River, NJ (US)

(72) Inventor: Joseph Lares, Barnegat, NJ (US)

(73) Assignee: Heyco, Inc., Toms River, NJ (US)

( * ) Notice: Subject to any disclaimer, the term of this patent is extended or adjusted under 35 U.S.C. 154(b) by 77 days.

(21) Appl. No.: 13/650,514

(22) Filed: Oct. 12, 2012

(65) Prior Publication Data
US 2013/0092801 A1 Apr. 18, 2013

Related U.S. Application Data

(60) Provisional application No. 61/547,369, filed on Oct. 14, 2011.

(51) Int. Cl.
*F16L 3/22* (2006.01)
*H02G 3/30* (2006.01)

(52) U.S. Cl.
CPC ...................................... *H02G 3/30* (2013.01)
USPC ............. 248/68.1; 248/70; 248/73; 248/74.2; 385/136

(58) Field of Classification Search
CPC ...... G02B 6/4471; G02B 6/4454; H02G 3/30; H02G 3/26; H02G 3/32; F16L 3/223
USPC .............. 248/65, 68.1, 70, 73, 74.2; 385/135, 385/134, 136, 137
See application file for complete search history.

(56) References Cited

U.S. PATENT DOCUMENTS

| 7,272,291 B2* | 9/2007 | Bayazit et al. | 385/135 |
| 8,254,742 B2* | 8/2012 | Womack | 385/135 |
| 2002/0136519 A1* | 9/2002 | Tinucci et al. | 385/134 |
| 2003/0228122 A1* | 12/2003 | Loh | 385/136 |
| 2007/0047891 A1* | 3/2007 | Bayazit et al. | 385/135 |

FOREIGN PATENT DOCUMENTS

| EP | 1061302 A1 | 12/2000 |
| EP | 2221518 A2 | 8/2010 |

OTHER PUBLICATIONS

PCT International Search Report and Written Opinion, dated Jul. 11, 2013 for PCT/US2012/059908, 10 pages.

* cited by examiner

*Primary Examiner* — Todd M Epps
(74) *Attorney, Agent, or Firm* — Greenberg Traurig, LLP

(57) ABSTRACT

A cable holder including a frame having a plurality of resiliently flexible trays arranged in a column. A top surface of one of the plurality of trays and the bottom surface of another of the plurality of trays immediately positioned above it forms a pocket that is sized and shaped to receive at least one cable. Each of the trays includes at least one low rail extending from the top surface thereof, and the remainder of the trays includes at least one high rail extending from the bottom surface thereof. A clip is secured to the frame for attachment to a bracket. The trays are depressed to open the pocket, enabling insertion of one or more cables therein or removal therefrom. The resiliency of the trays along with the low rails and high rails deform the cables to form slight bends therein to prevent side-to-side movement or slippage of the cables.

7 Claims, 6 Drawing Sheets

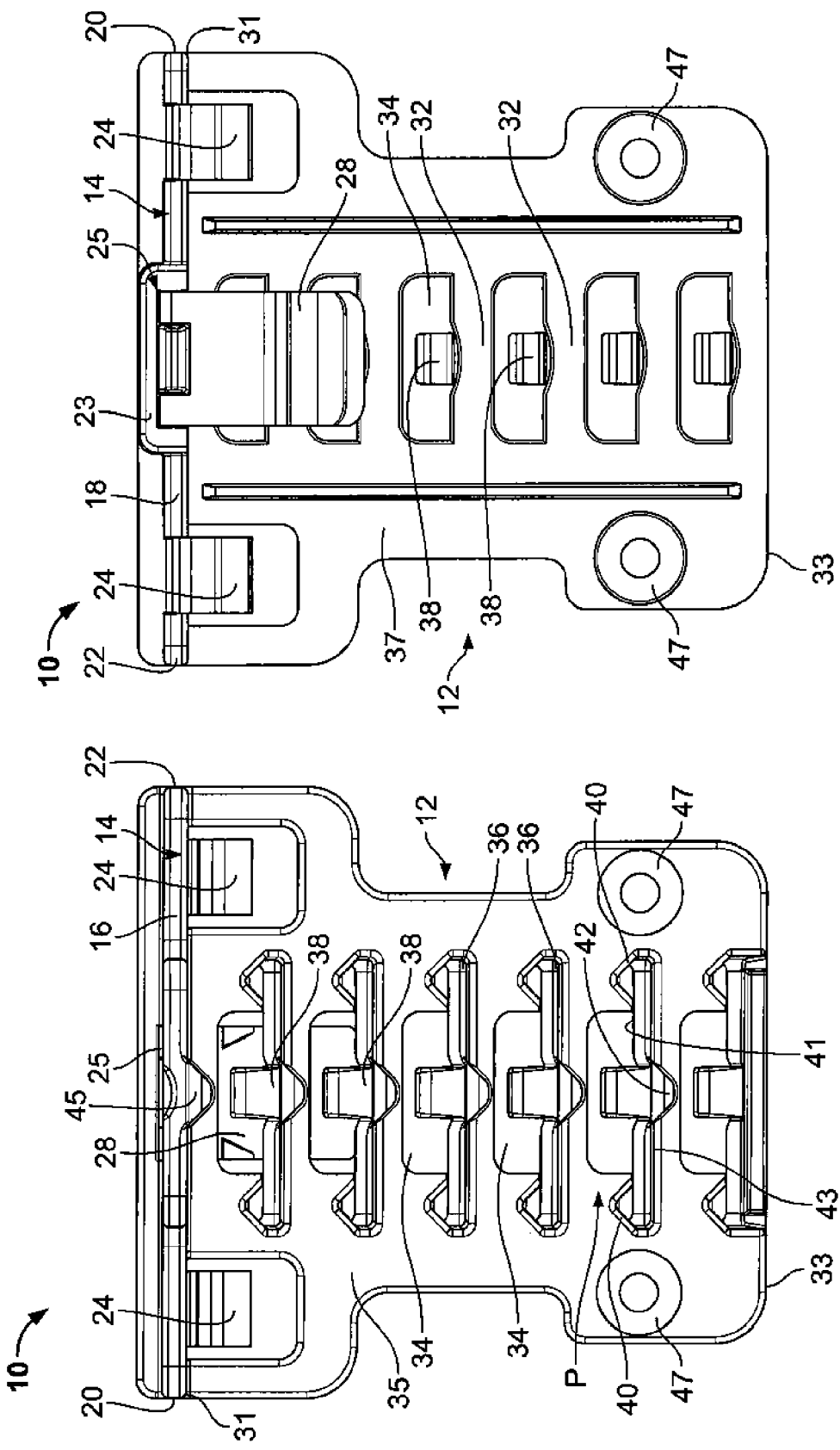

CABLE HOLDER

CROSS-REFERENCE TO RELATED APPLICATION

This application is a §111(a) application and claims the benefit of U.S. Provisional Patent Application Ser. No. 61/547,369, filed Oct. 14, 2011 and entitled "CABLE HOLDER," which is hereby incorporated by reference herein in its entirety for all purposes.

FIELD OF THE INVENTION

The present invention relates to a cable holder, and, more particularly, to a cable holder adapted to secure a plurality of cables.

BACKGROUND OF THE INVENTION

Cable holders organize and support wires and cables in various settings and locations. In addition to providing support, cable holders may include mechanisms that restrain motion of the cables at their points of support. Such mechanisms, however, may also provide unnecessary restraints in inserting and removing cables from the cable holder.

SUMMARY OF THE INVENTION

The present invention overcomes the disadvantages and shortcomings discussed above by providing a cable holder having a mechanism that enables quick insertion and release of cables into and out of the cable holder, while restraining movement of the cables when installed therein. The cable holder comprises a frame including a hanger having a first end, a second end opposite the first end, a first side, a second side opposite the first side, and a plurality of trays extending from the first side. Each of the plurality of trays includes a top surface and a bottom surface opposite the top surface, the top surface of one of the plurality of trays and the bottom surface of another of the plurality of trays immediately positioned above said one of said plurality of trays forming a pocket that is sized and shaped to receive at least one cable.

Each of the plurality of trays includes at least one low rail extending from said top surface thereof. In another embodiment, each of the plurality of trays includes a plurality of low rails. In an embodiment, at least one of the plurality of trays includes at least one high rail extending from the bottom surface thereof. In an embodiment, the plurality of trays are arranged in a column extending proximate from the first end of the hanger and proximate to the second end of the hanger. In an embodiment, one of the plurality of trays positioned proximate to the second end of said hanger does not include a high rail, while each of the remaining of the plurality of trays includes at least one high rail. In an embodiment, each of the plurality of trays includes an upward lip extending therefrom. In an embodiment, each of the plurality of trays is resiliently flexible such that it is moveable by depressing the upward lip.

The frame includes a canopy attached to the first end of the hanger. The canopy includes a bottom surface and at least one high rail extending from the bottom surface of the canopy. The cable holder further comprises a clip attached to the canopy, the clip being sized and shaped to attach the cable holder to a structure. In an embodiment, the clip includes at least one opening, and the canopy includes a rear side and a projection extending outwardly from the rear side, the projection of the canopy being sized and shaped to receive the at least one opening of the clip. In an embodiment, the clip includes a head, a leg portion extending substantially perpendicular from the head, and a back portion extending substantially perpendicular from the head, the at least one opening includes a first opening formed within the leg portion and a second opening formed within the at least back portion. In an embodiment, the rear side of the canopy includes a slot, and the leg portion and back portion are positioned within the slot. In an embodiment, the clip includes at least one spur.

In an embodiment, the canopy includes at least one tab extending outwardly from the rear side thereof for engagement with the structure. In another embodiment, the canopy includes a plurality of tabs. In an embodiment, the hanger includes at least one mounting hole formed therein that is sized and shaped to receive a fastener for fastening the cable holder to the structure.

BRIEF DESCRIPTION OF THE DRAWINGS

For a more complete understanding of the present invention, reference is made to the following detailed description of an exemplary embodiment considered in conjunction with the accompanying drawings, in which:

FIG. 2 is front elevational view of the cable holder shown in FIG. 1;

FIG. 3 is a rear elevational view of the cable holder shown in FIG. 1;

DETAILED DESCRIPTION OF THE DRAWINGS

Figure 1:
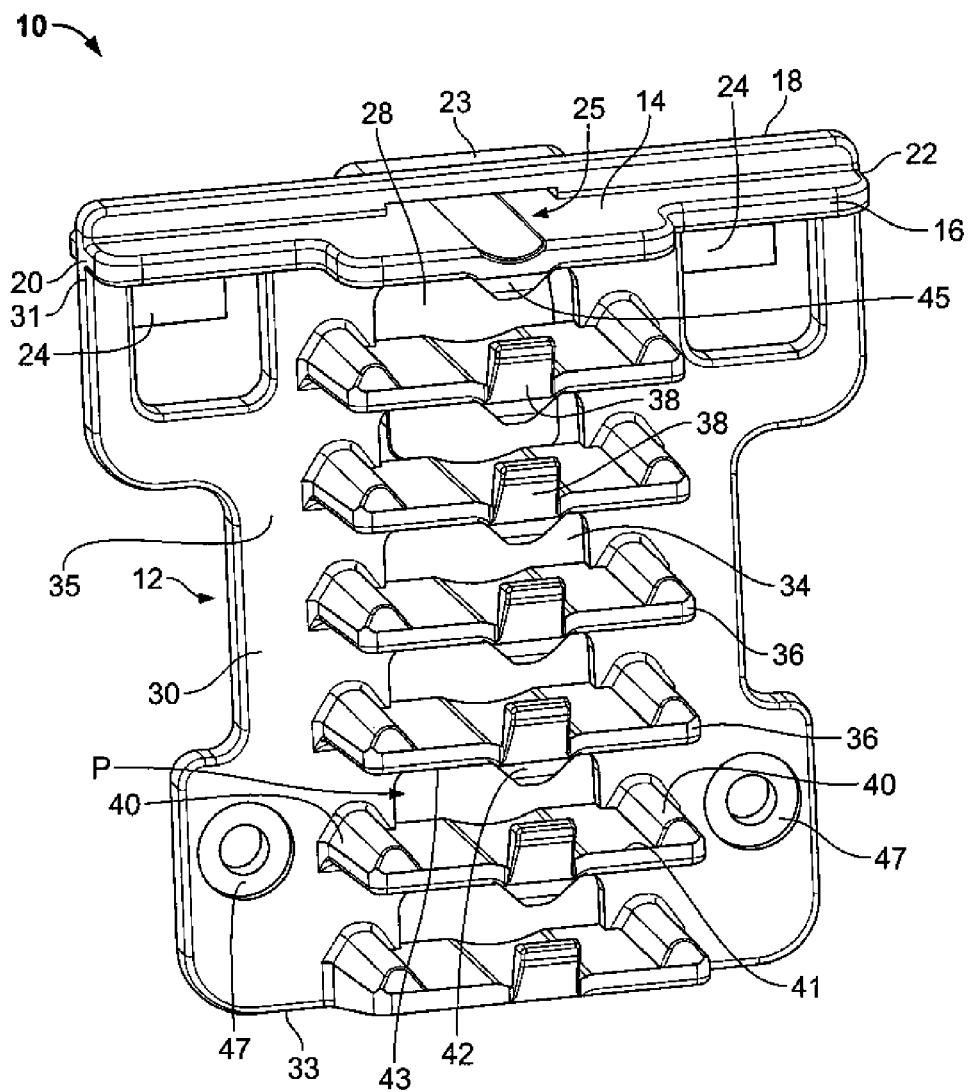
FIG. 1 is a front perspective view of a cable holder constructed in accordance with an embodiment of the present invention.
Figure 4:
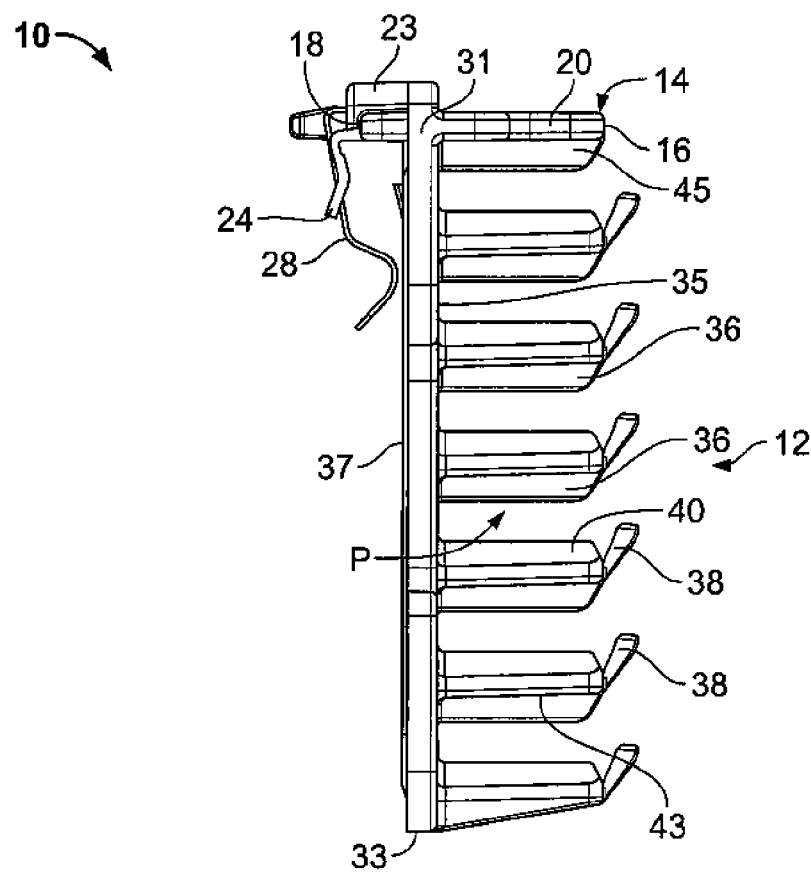
FIG. 4 is a side elevational view of the cable holder shown in FIG. 1.
Figure 5:
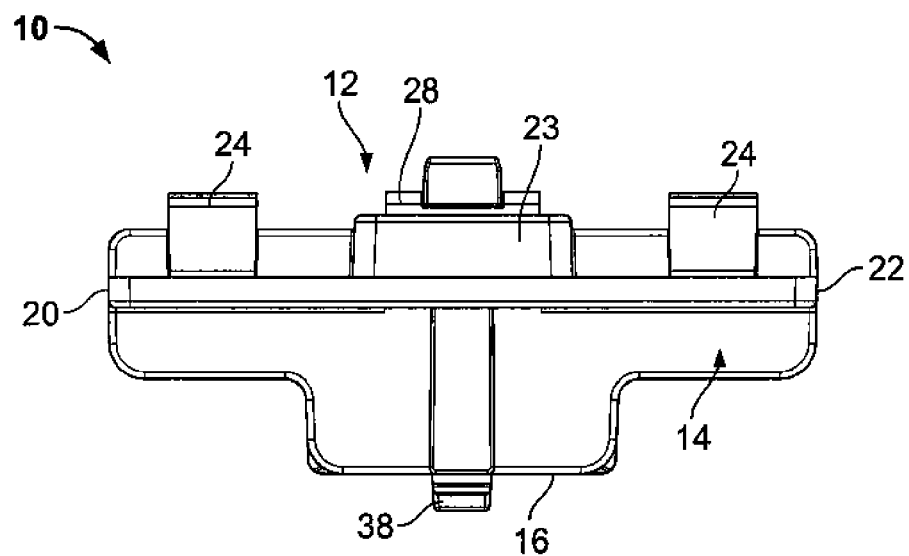
FIG. 5 is a top plan view of the cable holder shown in FIG. 1.

FIGS. 1 through 6E illustrate a cable holder 10 that is constructed in accordance with an embodiment of the present invention. Although the cable holder 10 can be used to support a plurality of cables used in connection with a variety of systems, it is particularly suitable for supporting cables on a bracket used in connection with an array of solar panels. Accordingly, the cable holder 10 will be described hereinafter in connection with a bracket used with an array of solar panels. It should be understood, however, that the following description is only meant to be illustrative of the present invention and is not meant to limit the scope of the present invention, which has applicability in supporting cables or wires on brackets, cabinets, or other structures that are used with other types of systems (e.g., electrical systems, other power generating systems, telecommunication systems, etc.).

Referring to FIGS. 1 through 5, the cable holder 10 includes a frame 12 that serves as a backbone for supporting all of the elements of the cable holder 10, which will be described hereinafter. In an embodiment, the frame 12 includes a substantially T-shaped canopy 14 having a front side 16, a rear side 18 opposite the front side 16, and sides 20, 22 intermediate the front and rear sides 16, 18. In another embodiment, the canopy 14 is substantially rectangular in shape. In other embodiments, the canopy 14 may have other suitable shapes. A ridge 23 having a slot 25 is formed on the rear side 18 of the canopy 14. In an embodiment, the ridge 23 is centrally positioned on the rear side 18 canopy 14. A pair of tabs 24 extends from the rear side 18 of the canopy 14, one of which is located proximate to the side 20, and the other of which is located proximate to the side 22. In an embodiment, each of the pair of tabs 24 extends rearward and downwardly from the rear side 18 of the canopy 14. In an embodiment, a projection 26 extends rearward from the rear side 18 of the canopy 14 and intermediate the sides 20, 22. In an embodiment, the projection 26 is positioned centrally on the rear side 18 of the canopy 14. In an embodiment, the cable holder 10 includes a clip 28 attached to the projection 26. In other embodiments, the cable holder 10 may include a plurality of the projections 26 and a plurality of the clips 28, each of which being attached to a corresponding one of the projections 26 (not shown in the Figures). The structure and function of the clip 28 will be described in greater detail hereinafter.

Figure 7:
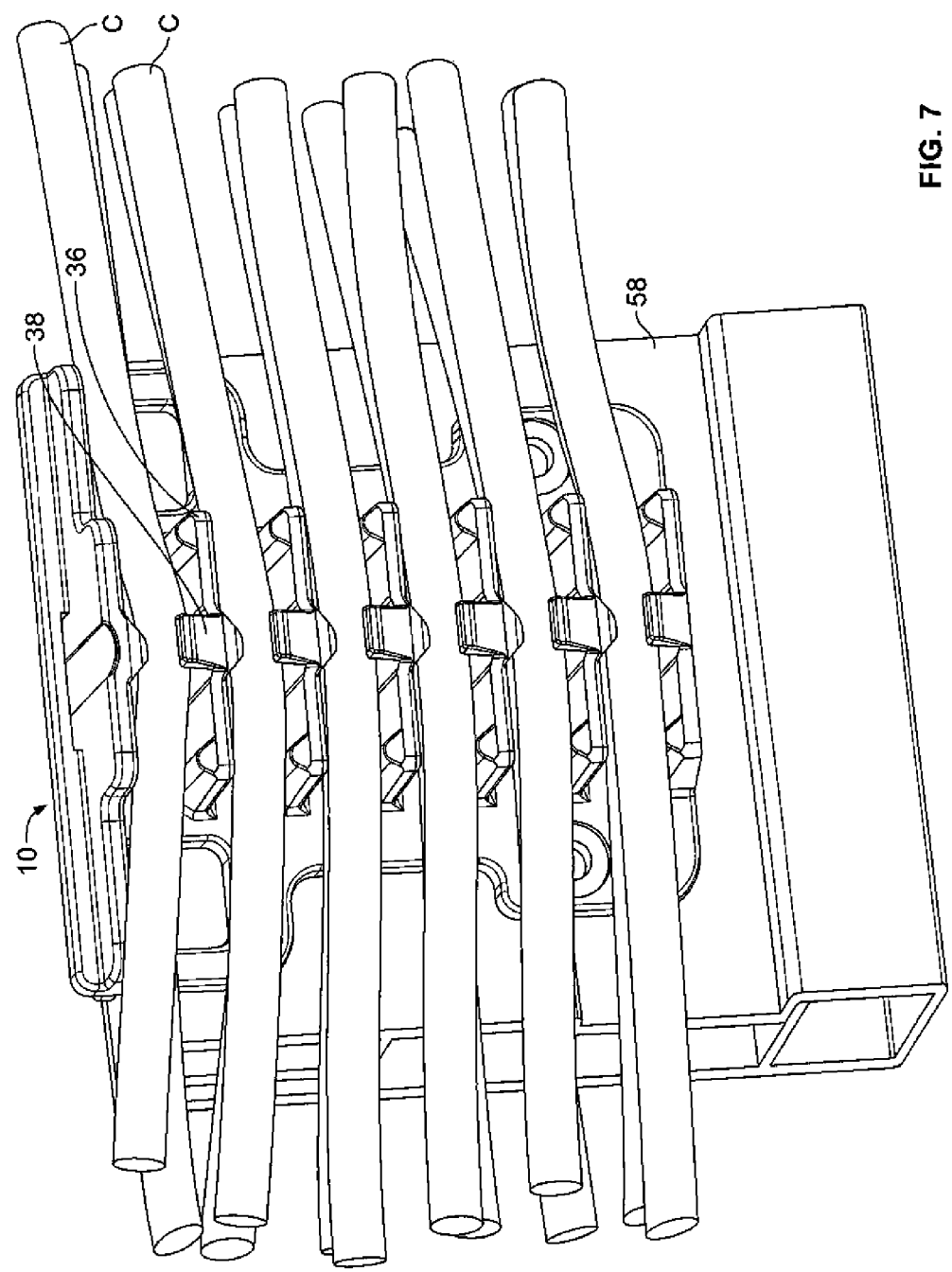
FIG. 7 is a front perspective view of the cable holder shown in FIG. 1 attached to a structure and a having a plurality of cables installed therein.
Figure 8:
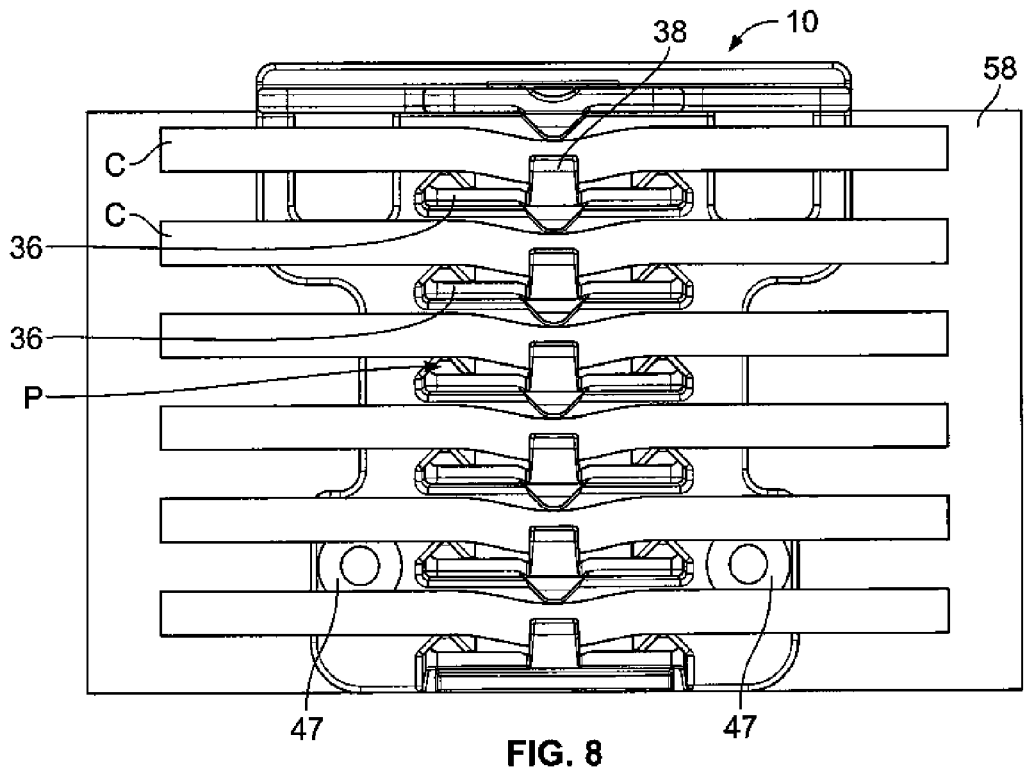
FIGS. 8 and 9 are front perspective and side elevational views, respectively, of the cable holder shown in FIG. 1 attached to other types of structures and having a plurality of cables installed therein.
Figure 9:
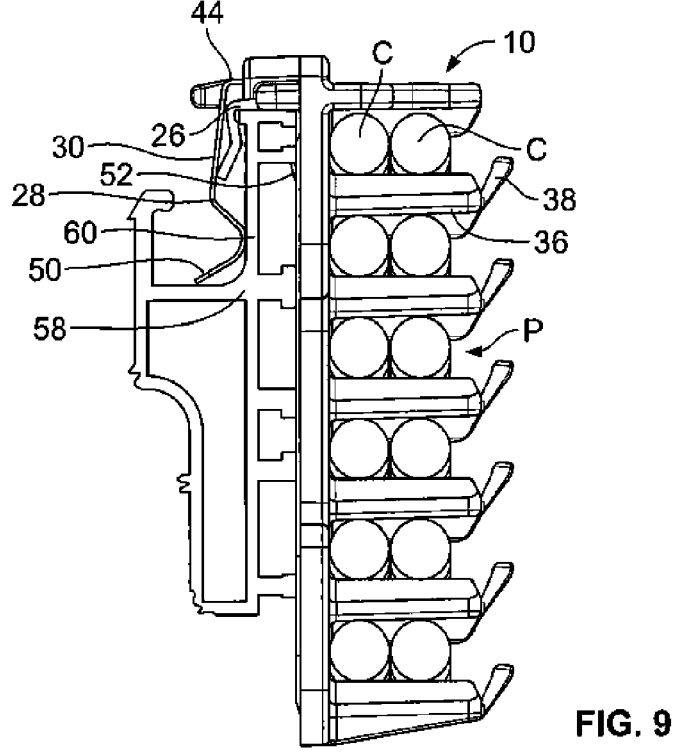

Still referring to FIGS. 1 through 5, the frame 12 includes a hanger 30 having a first end 31 and a second end 33 opposite the first end 31, and a front side 35 and a rear side 37 opposite the front side 35. In an embodiment, the canopy 14 is formed integrally with the hanger 30 at the first end 31 thereof. In an embodiment, the hanger 30 supports a plurality of horizontally oriented panels 32 (see, for example, FIG. 3) located between the first and second ends 31, 33, and which are separated from one another by a plurality of openings 34. In an embodiment, the hanger 30 includes a plurality of trays 36 (or steps), each of which is attached to an upper forward portion of a corresponding one of the plurality of panels 34 for supporting cables C therein, as shown in FIGS. 7 through 9, which will be described hereinafter. In an embodiment, the plurality of trays 36 is arranged in a column, as shown in FIGS. 1 through 5. In an embodiment, each of the plurality of trays 36 is resiliently flexible, which will be described in greater detail hereinafter. In an embodiment, an upward lip 38 is formed on the front portion of each of the plurality of trays 36. In an embodiment, each of the lips 38 is centrally positioned on its corresponding one of the trays 36. In another embodiment, each of the trays 36 includes a plurality of the lips 38. In an embodiment, each of the lips 38 is angled in shape. In another embodiment, each of the lips 38 is curvilinear in shape. In an embodiment, each of the plurality of trays 36 includes a pair of spaced-apart, low-rails 40 formed on a top surface 41 thereof, and a centrally-located high-rail 42 formed on a bottom surface 43 thereof. In an embodiment, a high-rail 42 is not formed on the bottom surface 43 of the lowest positioned tray 36 (see FIGS. 1, 2 and 4). In an embodiment, a high rail 45 is formed on the bottom of the canopy 14 (see FIGS. 1, 2 and 4). In an embodiment, the top surface 41 of one of the plurality of trays 36 and a bottom surface 43 of another of the plurality of trays 36 immediately positioned above the one of the plurality of trays 36 forms a pocket P that is sized and shaped to receive at least one cable C. In another embodiment, the pocket P is sized and shaped to receive a plurality of the cables C.

In an embodiment, the hanger 30 includes a pair of mounting holes 47 formed therein to facilitate mounting of the cable holder 10 to a structure with fasteners (not shown in the Figures). In an embodiment, the mounting holes 47 are positioned proximate to the second end 33 of the hanger 30. In another embodiment, the hanger 30 may include more or less than the pair of mounting holes 47. In another embodiment, the hanger 30 need not include the mounting holes 47.

As to be described in further detail hereinafter, each of the lips 38 is pressed downwardly by a user to insert at least one cable C into the pocket P of the trays 36, as well as to remove the at least one cable C therefrom. In an embodiment, the cable holder 10 includes six of the trays 36. Alternatively, in other embodiments, the cable holder 10 may include more or less than six of the trays 36 to accommodate a desired number of the cables C.

The resiliency of each of the trays 36, in combination with the positioning of the low rails 40 formed thereon and the high rails 42, 45 formed on the immediately above tray 36 or canopy 14, as appropriate, deform the contours of the cables C to form slight bends therein, which restrains the cables C from moving in the direction of the longitudinal axis of the cables C. The hanger 30 and the lips 38 of the trays 36 restrain the cables C from moving in the transverse direction (i.e., the direction that is oriented perpendicularly to the longitudinal axis of the cables C). In an embodiment, each of the low rails 40 and the high rails 42, 45 includes a slight rounded radius so as not to pierce the cables C.

In an embodiment, the frame 12 may be made of NORYL® resin, nylon 6, or other suitable materials known in the art to provide the necessary flexibility required for installing and removing the cables C into and from the cable holder 10, in a manner which is described hereinbelow. In an embodiment, the frame 12 may be injection molded and, therefore, fabricated in one piece to achieve a high strength-to-weight ratio and to maintain structural integrity over long periods of use.

Figure 6A:
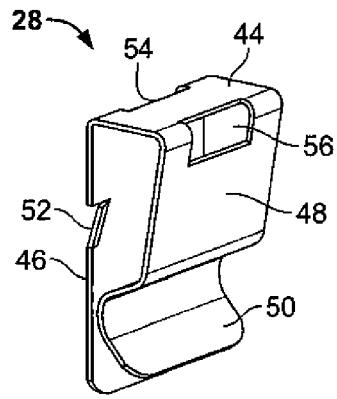
FIGS. 6A through 6C are front perspective, front elevational, and side elevational views, respectively, of a clip employed by the cable holder shown in FIG. 1.
Figure 6B:
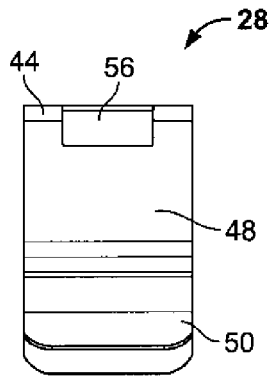
Figure 6C:
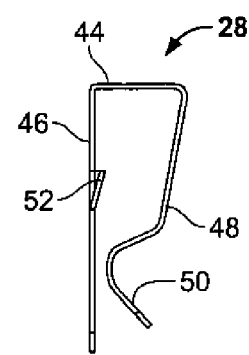
Figure 6D:
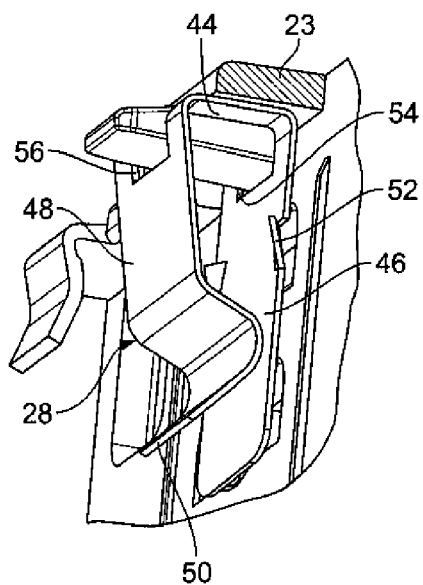
FIGS. 6D and 6E are partial sectional views of the cable holder shown in FIG. 1, with an emphasis on the clip shown in FIGS. 6A through 6C.
Figure 6E:
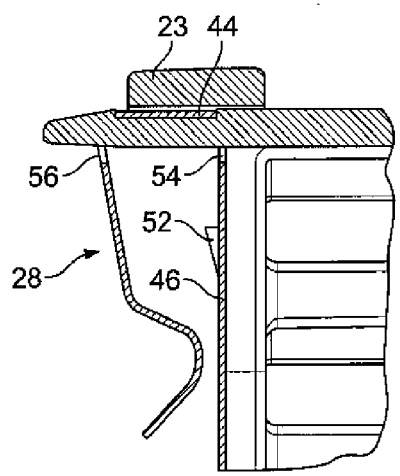

Referring now to FIGS. 6A through 6E, the clip 28 includes a head 44, a back 46, and a leg 48 with a foot 50. The back 46 of the clip 28 includes a pair of spurs 52 formed thereon, for purposes that are described below. An opening 54 is positioned within the back 46 of the clip 28, while an opening 56 is positioned within the leg 48 of the clip 28. In an embodiment, both of the openings 54, 56 are located proximate to the head 44 of the clip 28. The clip 28 is installed on the frame 12 of the cable holder 10 by sliding the openings 54, 56 over the projection 26 and pressing it through the opening 56 of the leg 48, thereby locking the clip 28 on the projection 26. In this regard, portions of the head 44 and the back 46 of the clip 28 fit within the slot 25 of the ridge 23 of the canopy 14. Referring specifically to FIGS. 6D and 6E, the clip 28 is also maintained in position by the head 44 of the clip 28 bearing the bottom of the ridge 23, and the back 46 of the clip 28 bearing on the canopy 14. In an embodiment, the clip 28 may be stamped out of 301 stainless steel. Alternatively, the clip 28 may be fabricated from other suitable materials known in the art, such as plastic.

In operation, with reference to FIGS. 7 through 9, the cable holder 10 is shown removably fastened to a bracket 58 that supports an array of solar panels (not shown in the Figures). The clip 28 is slipped onto the top of the bracket 58, with the end opposite the head 44 of the clip 28 being inserted first, until the tabs 24 bear on the top of the bracket 58. The clip 28 is retained on the bracket 58 by the spurs 52 which provide resistance to raising the clip 28 upwardly off of the bracket 58, while the foot 50 of the clip 28 grasps a projection 60 formed on the bracket 58 (see, for example, FIG. 9). In an embodiment, the clip 28 can secure the cable holder 10 to a wide range of sizes and profiles of the bracket 58, as shown in FIGS. 7 through 9. In an embodiment, the bracket 58 is an aluminum extrusion. In an embodiment, the mounting holes 47 may be used in conjunction with the clip 28, or in place of it, for receiving fasteners (e.g., bolts or screws) to attach the cable holder 10 to the bracket 58 (not shown in the Figures).

With continued reference to FIGS. 7 through 9, once the cable holder 10 is fastened on the bracket 58, a user may place the cables C in the trays 36 of the cable holder 10. More particularly, in an embodiment, the user depresses the lip 38 of the upper most positioned tray 36, and places one or more of the cables C in its corresponding pocket P. The user then proceeds to place one or more additional cables C in the next tray 36 (e.g., immediately below), and so on, unit the lowest most position tray 36 is filled with the cables C, as necessary depending upon the application. This sequence is utilized so that the user is always able to depress the lip 38 of one of the trays 36 without the tray 36 having the resistance of the cables C being positioned below it. To remove the cables C from the cable holder 10, the reverse of the installation process is utilized (i.e., the user starts removing the cables C from the lowest tray 36 first and so on). In this manner, the installation and the removal of the cables C is accomplished by depressing the lip 38 downwardly and inserting or removing the cables C into and out of the tray 36, respectively, in one simple motion. Of course, in other embodiments, not all of the trays 36 need be utilized, and the cables C can be inserted into a selected one of more of the trays 36.

In an embodiment, the flexibility of the trays 36 also accommodates a range of diameters of the cables C that may fit within the cable holder 10. In an embodiment, the cable holder 10 may hold up to twelve of the cables C, with each of the trays 36 being sized and shaped to receive two of the cables C. Alternatively, each of the trays 36 may receive more or less than two of the cables C. In an embodiment, the cable holder 10 is adapted to receive cables C each with a diameter within a range from 0.20 inch (5.2 mm) to 0.28 inch (7.2 mm). Alternatively, the cable holder 10 can receive cables C having other diameters.

It should be noted that the present invention can have numerous modifications and variations. In an embodiment, the clip 28 may be replaced with an adhesive covered pad that may be affixed to the back of the frame 12 to attach the cable holder 10 to the bracket 58. Other suitable mounting means known in the art to attach the cable holder 10 to the bracket 58 may be utilized. All such variations and modifications are intended to be included within the appended claims.

What is claimed is:

1. A cable holder, comprising:
    a frame including a hanger having a first end, a second end opposite said first end, a first side, a second side opposite said first side,
    a canopy attached to said first end of said hanger, said canopy including a bottom surface, at least one high rail extending from said bottom surface, a rear side, and a projection extending outwardly from said rear side,
    a clip attached to said canopy, said clip being sized and shaped to attach said cable holder to a structure, a head, a leg portion extending substantially perpendicular from said head, a back portion extending substantially perpendicular from said head, a first opening formed within said leg portion, and a second opening formed within said back portion, said projection of said canopy being sized and shaped to receive said at first opening and said second opening of said clip,
    and a plurality of trays extending from said first side of said hanger and arranged in a column extending proximate from said first end of said hanger and proximate to said second end of said hanger, each of said plurality of trays includes a top surface and a bottom surface opposite said top surface, said top surface of one of said plurality of trays and said bottom surface of another of said plurality of trays immediately positioned above said one of said plurality of trays forming a pocket that is sized and shaped to receive at least one cable, each of said plurality of trays including a plurality of low rails extending from said top surface thereof, each of said plurality of trays, except for one of said plurality of trays that is positioned proximate to said second end of said hanger, including at least one high rail extending from said bottom surface thereof, each of said plurality of trays including an upward lip extending therefrom, and each of said plurality of trays being resiliently flexible such that it is moveable by depressing said upward lip.

2. The cable holder of claim 1, wherein said rear side of said canopy includes a slot, and wherein said leg portion and said back portion are positioned within said slot.

3. The cable holder of claim 2, wherein said back portion of said clip includes at least one spur.

4. The cable holder of claim 3, wherein said canopy includes at least one tab extending outwardly from said rear side of said canopy.

5. The cable holder of claim 4, wherein said at least one tab includes a plurality of tabs.

6. The cable holder of claim 1, wherein said hanger includes at least one mounting hole formed therein that is sized and shaped to receive a fastener for fastening said cable holder to said structure.

7. The cable holder of claim 1, wherein said at least one cable includes a plurality of cables.

* * * * *